May 19, 1953  C. R. CROY  2,638,815
OPTICAL IMAGE FOCUSING APPARATUS
Filed Oct. 27, 1950

INVENTOR.
CHARLES R. CROY
BY Edward M. Apple
ATTORNEY

Patented May 19, 1953

2,638,815

UNITED STATES PATENT OFFICE 2,638,815

OPTICAL IMAGE FOCUSING APPARATUS

Charles R. Croy, Ecorse, Mich.

Application October 27, 1950, Serial No. 192,509

2 Claims. (Cl. 88—57)

This invention relates to focusing apparatus and has particular reference to an apparatus which will focus the image of an object in upright position, with improved depth.

An object of the invention is to provide a device of the character indicated, which is suitable for use with a camera, a projecting machine or optical instruments such as a microscope, telescope or other equipment employing lenses.

A further object of the invention is to generally improve devices of the character indicated and to provide a focusing instrument which is simple in construction, economical to manufacture, efficient in operation, and one readily adaptable to presently known and conventional equipment.

Another object of the invention is the provision of a focusing apparatus which, when used with a camera or projector, will produce a picture on the film or screen in upright position and with improved depth.

Another object of the invention is to provide a focusing device which is easily assembled and dismantled for cleaning and repair.

The foregoing and other objects and advantages of the invention will become more apparent as the description proceeds, reference being made from time to time to the accompanying drawings, forming part of the within disclosure, in which drawings.

Figure 1:
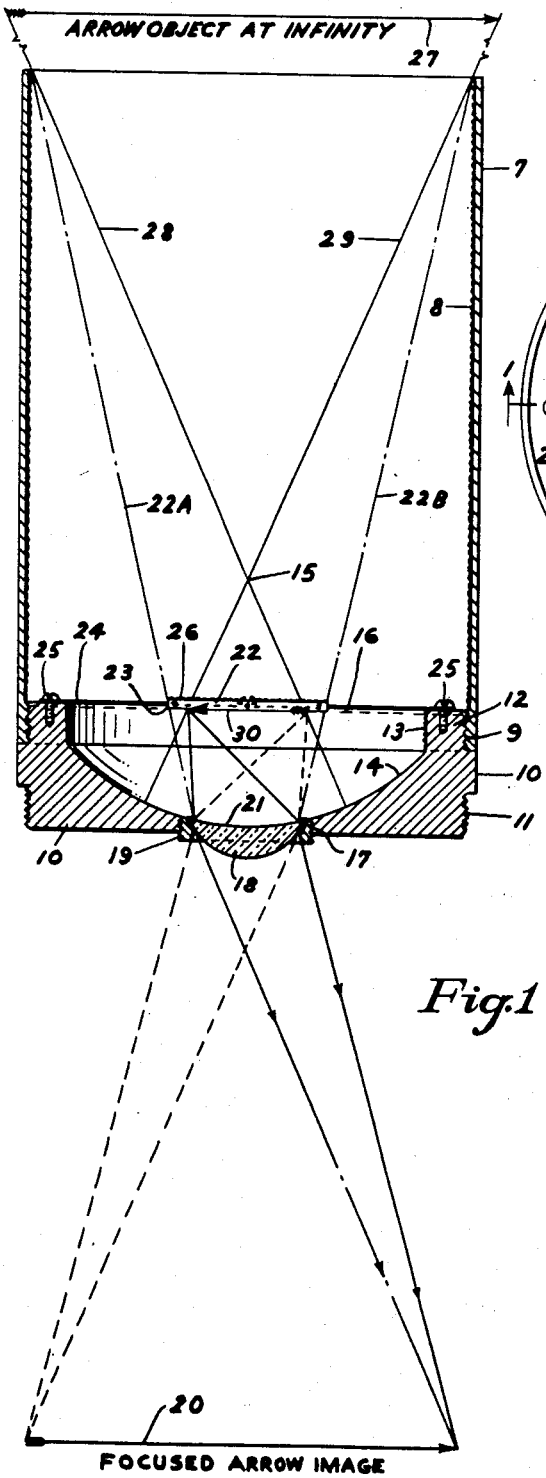
Fig. 1 is a longitudinal section taken through a device embodying the invention and taken substantially on the line 1—1 of Fig. 2.
Figure 2:
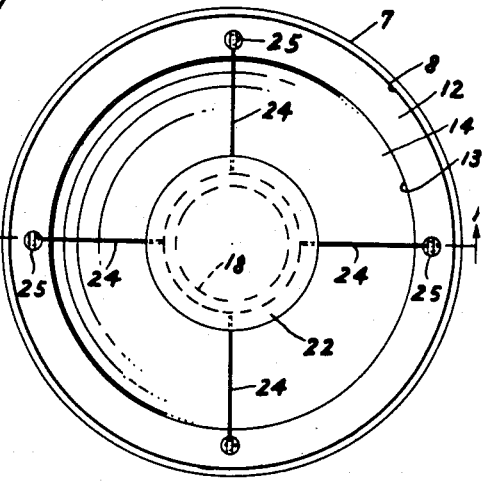
Fig. 2 is a top plan view of the device shown in Fig. 1.

Referring now more particularly to the drawings, it will be understood that in the embodiment herein disclosed, the reference character 7 indicates a tubular member formed of aluminum or other suitable material which is ribbed and colored flat black on the inside, as at 8, to obviate any tendency of stray light being deflected from the walls of the tube in a manner which would interfere with the proper functioning of the apparatus.

The tubular member 7 is threaded at one end, as at 9, to engage external threads formed on the end closure member 10, which is made of any suitable material capable of receiving and holding a mirror finish. The end closure member 10 is externally threaded, as at 11, so that the device may be secured to a camera, or other optical device.

The rim portion 12 of the end closure member 10 is ribbed and colored black, as at 13, and serves the same purpose as the ribs and coloring on the interior of the tubular member 7. The inner wall 14 of the end closure member 10 is concave and is provided with a highly reflective mirror surface, and serves as a concave mirror having its curvature radius point at 15 and having its infinite focal plane at 16.

The end closure member 10 is provided with a centrally positioned threaded opening 17, in which is positioned a suitable lens 18 which is held in position by a retainer ring 19. The lens 18 is provided with a focal length suitable for focusing an image at a predetermined position, as at 20. The focal point of said lens being short enough to fall a little below the infinite focal plane of the concave mirror 14, in axial alignment.

A flat mirror 22 having its reflective surface 23 facing the lens 18 is suspended by means of four fine wires 24 colored black, which are preferably embedded in the edges of the flat mirror 22, the opposite ends of which are looped to engage screws 25, which are adapted to engage threaded recesses formed in the rim portion 12 of the end closure member 10. It will be noted that the reflective surface 23 of the flat mirror 22 cuts the infinite focal plane 16 of the concave mirror 14.

The flat mirror is circular and its diameter is slightly larger than the diameter of the lens 18 in order to stop stray light interference with the lens 18. In other words, the mirror will cut off all rays of light which strike the top of the mirror 22 between the lines 22A and 22B. The back of the mirror 22 is ribbed and colored black, as at 26, to effect the same result as the ribs and coloring 8 on the inside of the tubular member 7. The reflective surface 23 of the mirror 22 is located midway between the surface of the concave mirror 14 and its radius point 15, in axial alignment.

The device functions as follows: Assuming that the object 27 is located between the radius lines 28 and 29 at infinitive distance from the concave mirror 14, all rays of light leaving the object 27 and striking the concave mirror 14 will be reflected toward, and focus on the surface 23 of the flat mirror 22, and this focused image 30 of the object 27 will appear on the reflective side 23 of the mirror 22 in inverted position. The inverted image 30 of the object 27 acts as an object for the lens 18. The rays of light stemming from the image-object 30 which are picked up by the lens 18 will focus the final image of the arrow along the focal plane, as at 20, which in a camera installation would be the film, the image 20 being upright with respect to the object 27.

Having described my invention what I claim and desire to secure by Letters Patent is:

1. An optical image forming apparatus, comprising a tubular member open at one end and closed at the other end by a removable end closure member, said tubular member having stray light reducing ribs on the inner periphery thereof, a concave reflective surface formed as a concave focusing mirror and carried by said end closure member, a centrally positioned opening in said end closure member, an image focusing lens supported in said opening, and a flat mirror supported in spaced axial relation with said lens and having its reflective surface lying on a plane common with the principal focal plane of said concave reflecting surface and at the shorter conjugate focus of said lens whereby an image of a distant object is focused by the concave reflective surface upon the flat mirror and then by the lens upon a surface axially spaced beyond said lens.

2. The structure defined in claim 1, which said flat mirror has a diameter comparatively larger than the diameter of said lens, and said flat mirror is positioned substantially midway between the said concave reflecting surface and its radius point.

CHARLES R. CROY.

References Cited in the file of this patent

UNITED STATES PATENTS

| Number | Name | Date |
|---|---|---|
| 822,751 | Mitchell | June 5, 1906 |
| 924,488 | Mustin | June 8, 1909 |
| 1,132,269 | Hough et al. | Mar. 16, 1915 |
| 1,318,155 | Kingsley et al. | Oct. 7, 1919 |
| 1,854,665 | Parker | Apr. 19, 1932 |
| 1,943,511 | Bauersfeld | Jan. 16, 1934 |
| 2,098,311 | Schattschneider | Nov. 9, 1937 |
| 2,153,709 | Bourniseen | Apr. 11, 1939 |
| 2,295,779 | Epstein | Sept. 15, 1942 |
| 2,326,552 | Morse | Aug. 10, 1943 |
| 2,476,898 | Nicoll | July 19, 1949 |
| 2,504,383 | Bouwers et al. | Apr. 18, 1950 |

FOREIGN PATENTS

| Number | Country | Date |
|---|---|---|
| 554,694 | Great Britain | Apr. 23, 1942 |